Nov. 10, 1964
L. T. BARNES
3,156,333
IDLING FUEL-SUPPLY CONTROL MECHANISM FOR
INDUCTION CARBURETORS OF VEHICLES
Filed Nov. 23, 1960
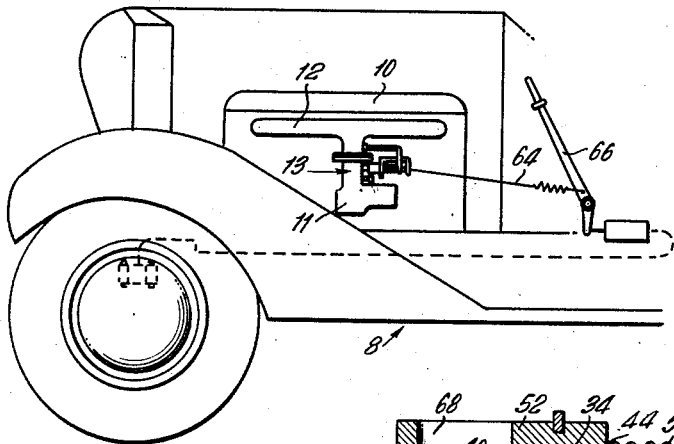
FIG. 1
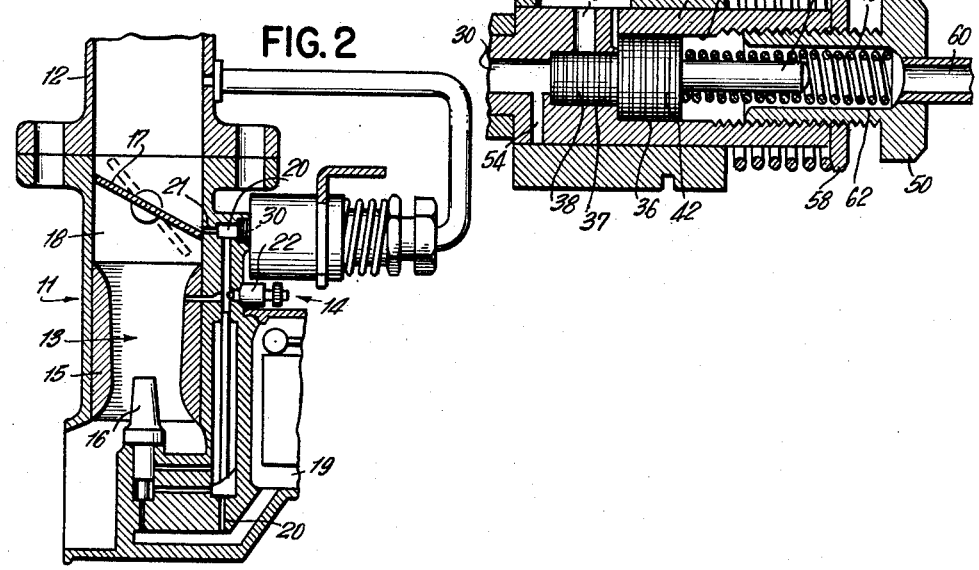
FIG. 2
FIG. 3
INVENTOR.
LLEWELLYN T. BARNES
BY
Amster + Levy
ATTORNEYS

3,156,333
IDLING FUEL-SUPPLY CONTROL MECHANISM FOR INDUCTION CARBURETORS OF VEHICLES
Llewellyn T. Barnes, 155 Atlantic Ave., Freeport, N.Y., assignor of thirty-three and one-third percent to Charles T. Barnes, Freeport, N.Y.
Filed Nov. 23, 1960, Ser. No. 71,265
1 Claim. (Cl. 192—3)

My invention relates to fuel-mixture supply and control mechanism for induction type carburetors for internal combustion engines.

More particularly the invention relates to such mechanism for varying the proportions of the fuel mixture issuing thru the low-speed orifice of such carburetors.

My invention attains improvement in the response of engine performance to initial movements of the throttle valve.

The inventive apparatus eliminates criticality of the low speed fuel-supply. It improves the fuel-mixture in the low speed running range of the engine especially during engine idling.

My invention provides substantial reduction of obnoxious exhaust gases during certain running conditions of the engine in a moving vehicle.

The concept of this invention features means for controlling the fuel-air mixture supplied to the cylinders of an internal combustion engine so that combustion takes place under optimum conditions for complete oxidation of the fuel at all speeds so that obnoxious exhaust gases are minimized, deposits on cylinder walls are eliminated, and smooth operation is possible no matter what speed the engine is operating at.

My invention attains reduced gasoline consumption during low speed running conditions of a moving vehicle and during idling of the engine in a stationary vehicle.

My invention which attains all these features is a simple, efficient, and dependable mechanism of rugged construction. It is easily adaptable for installation and use in existing engines with substantially no modification of the engine.

While the novel and distinctive features of the invention, are particularly pointed out in the appended claim, a more expository treatment of the invention, in principle and in detail, together with additional objects and advantages thereof, is afforded by the following description and accompanying drawings in which:

FIG. 1 is a semi-diagrammatic view of a portion of a vehicle showing a preferred arrangement of my inventive fuel-supply control mechanism associated with an engine and operable by a hand brake, FIG. 2 is an enlarged fragmentary sectional view of the carburetor of the engine of FIG. 1 showing parts immediately associated therewith including a fragment of the intake manifold and an auxiliary air control unit shown in elevation, FIG. 3 is an enlarged sectional view of the air control unit at FIG. 2.

Referring to FIGS. 1 to 3, a portion 8 of a vehicle is illustrated. An internal combustion engine 10 is provided with an induction type carburetor 11 conventionally connected with an intake manifold 12. The carburetor 11 is provided with a main fuel supply means indicated generally as 13. Carburetor 11 is provided also with a low speed and idling fuel supply means 14. The main fuel supply comprises a mixture of air and liquid gasoline or the like. The air is drawn thru a venturi tube 15. A nozzle 16 is disposed in the throat of venturi tube 15. The liquid constituent of the mixture is drawn through nozzle 16 during subatmospheric conditions existing in the throat of the venturi 15 created by rapid passage of air therethrough. The subatmospheric conditions or vacuum acting upon the main jet in the venturi 15 are controllable by a throttle valve 17. Throttle valve 17 is adjustably pivotally mounted in a throttle valve barrel 18 disposed in downstream communication with the venturi tube 15. The low speed and idling fuel charge comprises a mixture of air and liquid fuel. The liquid constituent of the low speed and idling fuel mixture is drawn from a float chamber 19 thru a passage 20 into an orifice 21 open to the barrel 18 on the downstream side of the throttle valve 17.

The quantity of liquid fuel which flows through orifice 21 is controlled by a valve 22. An air supply port 30 is preferably provided in communication with the passage 20 downstream of the orifice. Air supplied through this port 30 mixes with the liquid fuel in the passage 20 to form an aerated mixture. This aerated mixture passes through the orifice 21 as an aerated jet. The aerated mixture is mixed with additional air passing through the venturi tube 15 and around the throttle valve 17 especially in the low speed positions of the throttle valve 17 including the idle position thereof.

The valve 22 which controls the liquid flow in the passage 20 may be adapted to control the flow of aerating air. In any suitable arrangement for obtaining the desirable aerated jet mixture proportions, consideration must be given to the total flow of the jet for desired optimum operating conditions.

The subatmospheric condition downstream of the barrel 18 is increased during closing of the throttle valve 17. The rate of this increase is variable with the rotation of the valve 17. The rate of increase is less in the low speed positions than in high speed position of the valve 17. The vacuum at low speed is considerably greater than during high speeds. The subatmospheric conditions in the manifold system correspond substantially to the subatmospheric conditions in the barrel 18, downstream of the throttle valve 17. The aerated liquid is considered and referred to as liquid hereinafter. During high engine speed the fuel charge is supplied by the main fuel supply means 16. High speed creates the necessary draft for effective action of the venturi 15 upon the main liquid supply nozzle. The main fuel charge during high speed is of major consequence. The contribution of the fuel charge entering the orifice 21 during high speed is inconsequential. During low and idling speeds the contribution of the fuel charge, comprising a mixture of air and liquid fuel, is shared by the main and orifice supply with the liquid contribution of the main supply means being negligible. This means supplies practically all air. The liquid constituent of the fuel charge is supplied through the orifice 21.

Movement of the throttle valve 17 in the low speed range does not materially alter the subatmospheric conditions in the manifold system. Since, during low engine speeds the induction conditions in the barrel affecting the orifice are substantially constant, the amount of liquid induced through the orifice is substantially constant. Slight changes of valve positions in this range do, however, materially alter the proportions of air to liquid in a low speed charge emanating from the orifice and from the air passing the throttle valve 17.

It will therefore be seen that in an engine set for optimum idling, the fuel charge in speeds slightly above idling becomes increasingly leaner until the throttle valve is opened sufficiently to cause the main liquid and air contribution to predominate. Conversely, in an engine set for optimum operation in a speed above idling, the predominating low speed mixture, predominating in still lower speed, becomes increasingly richer. In other words, if an engine runs smoothly and economically at idling speed at approximately 200 r.p.m., at engine speed of approximately 400 r.p.m. the mixture is lean and the engine runs unsteadily. The quantity of the liquid jet issuing from the orifice is slightly reduced or increased at the speeds mentioned but the supply of main air is increased considerably from 200 to 400 r.p.m., thereby greatly affecting the mixture proportions. At 600 r.p.m. the quantity of fuel induced through the orifice is slightly reduced, whereas a still greater amount of main air is drawn past the throttle valve and thereby leans the mixture further, probably to an extent where the engine begins to run rough and misfire occasionally.

The contribution of the liquid fuel from the main jet in relation to the above exemplary speeds would probably begin about at 800 r.p.m. thereby preventing the further leaning of the fuel charge which upon higher speeds improves rapidly in richness of the mixture due to the effective withdrawal of liquid from the main jet operating in response to venturi functions admittedly efficient at high air velocities.

If, however, the adjustments of the carburetor are such as to provide smooth and economical performance of the engine in the deficient speeds above mentioned, the fuel charge becomes too rich in the lower and idling speeds.

In order to compensate for the air deficiences of the fuel charges in conditions aforementioned, means are provided to automatically regulate and control the entry of auxiliary air through air passage 30 to the liquid fuel constituent, issuing from the orifice 21 of the combustible charge.

This auxiliary air control mechanism comprises a cylindrical body 34 having a bore 44 and a slidable plunger or piston 36 therein. The piston 36 is provided with a reduced portion 38 movable in a bore 37 communicating with the air passage 30. Reduced portion 38 acts as a valve member for the auxiliary air inlet passage 40 to control communication of passage 40 with the air passage 30. The piston 36 is provided with a plurality of circular grooves 42 providing sealing engagement with the bore 44 in which it operates. The piston 36 is also provided with a pin 46 for centering a spring 48. An end of the spring 48 abuts the piston 36. The cylindrical body 34 has a stationary adjusting cap 50 threadedly adjustably secured thereto which is engaged by the other end of the spring 48. The spring 48 normally urges the piston 36 into its closed position. A sleeve 52 is slidably mounted in surrounding circumferential relationship with the body 34. The sleeve 52 is spring pressed to cover an air inlet passage 54 by means of a spring 56. Spring 56 is disposed under compression between the sleeve 52 and a locknut 58. By sliding the sleeve 52 against the action of the spring 56 the port 54 which communicates with air passage 30 is opened to the atmosphere. This locknut 58 cooperates with the adjusting cap 50 to maintain the cap 50 in an adjusted locked position. The cap 50 is provided with a bore 62 therein and a tube 60 communicates with the intake manifold system and with the bore 62. The bore 62 is in communication with bore 44 and thus the bore 62 provides a suction cylinder in order that the piston may be drawn in a direction against the spring 48 to move the valve member formed by the piston portion 38 away from the auxiliary air passage 40 to allow communication between an air entrance port 68 and the air passage 30 in accordance with the subatmospheric conditions in the intake manifold system.

The sleeve 52 is connected by a linkage mechanism 64 to a hand brake 66 of the vehicle. The arrangement is such that upon application of the hand brake 66, the passage 54 is open to the atmosphere and air is drawn through this passage into the air passage 30 during certain subatmospheric conditions of the engine. Air entrance port 68 is provided and is of such dimensions as to leave the passage 40 open to the atmosphere in all positions of the sleeve 52.

The amount that spring 48 is under compression is preferably adjusted so that under normal speed conditions, when open sufficiently to cause effective draft in the venturi, the valve 36 is drawn back by the relatively low suction applied through tube 60 to a position where the passage 40 is almost or slightly open to communication with the passage 30. It will therefore be seen that upon a change in the subatmospheric conditions in the intake system of the engine, especially upon an increase in vacuum, the auxiliary air passage 40 is opened further and thereby affords a greater entry for auxiliary air. Upon the creation of extremely high vacuum conditions such as are encountered when the vehicle speed is greater than and overrunning the engine, the piston 36 is drawn back sufficiently to completely open the passage 40. This passage 40 is preferably larger than the liquid metering and aerated air adjustments for the orifice, and therefore substantially air only will be drawn through the orifice.

It is well known that obnoxious gases are created and are issued from the exhaust manifold during and following engine overrunning operation and during idling. This due to incomplete combustion of the liquid constituent of the liquid jet. In overrunning condition a high vacuum is developed in the intake system due to the engine being rotated at a speed above normal idling speed which which creates a severe drain on the fluid in the idling chamber which is unaccompanied by a proper amount of air to create a combustible mixture. Hence, the fuel charge is partially distilled before being fired and passes into the exhaust system incompletely burned and giving up these obnoxious fumes.

This auxiliary air supply mechanism by suitable adjustment of the flow capacities and the spring can be made to cut out the supply of fuel through the orifice during overrunning conditions of operation.

In operation of the auxiliary air supply device, and during high speed conditions, the portion 38 is urged into the position shown in FIG. 3 under influence of the spring 48. The spring 48 is preferably adjusted so that at a predetermined low speed the controlling edge of the piston 36 is in a positiion where it is about to open or partially opens the auxiliary air port 40 due to suction through tube 60 in opposition to the spring 48. As the speed of the engine is lowered and the suction effect upon the piston is increased, the piston is moved further to increase the auxiliary air port opening. The portion 38 is capable of further movement to further increase the auxiliary air port capacity on overrunning conditions.

In the conditions of operation of the engine when the vehicle is stationary and the engine is idling, it is in some cases desirable to lean out the idling fuel mixture issuing through the orifice. This desirability occurs in delivery vehicles wherein the major operating time of the engine occurs when the vehicle is stationary and the engine is idling. A good example of such condition is in the operation of milk delivery vehicles where it has been found desirable to keep the engine running so as to avoid the necessity of employing the starting means too frequently. In such vehicles the condition of the auxiliary air port 40 of the mechanism of FIG. 3 during idling of the engine is partially open. Upon such idling the sleeve 52 is moved by the application of the hand brake 66 to expose the port 54 to the atmosphere. Upon exposing port 54 to the atmosphere the air passing the throttle valve 17 during idling enters the passage 30 together with the auxiliary air supplied by the port 40. This condition is known as curb idling. The engine may be operated during curb idling on a leaner mixture than in normal idling. The curb idling mixture is made merely sufficient to maintain an idling condition. This provides economy of operation because of fuel saving during curb idling.

The opening 68 may be of such size and disposition as to completely close the port 40 upon application of the hand brake and thereby effect a substitution of auxiliary air supply through the port 54 instead of the port 40. The relative size of the port 54 may be the same as the port capacity 40 to provide fixed auxiliary air supply conditions. Alternatively, the port 54 may be larger so as to provide fixed economical curb idling conditions.

Having thus described the invention, it is to be understood that the underlying principles disclosed relates to varying the amount of auxiliary air supply for idling and low speed conditions of the engine as affecting the mixture proportions in accordance with the induction forces in the intake system.

Various other arrangements embodying the inventive principle may be made without departing from the disclosure as embodied in the following claim.

I claim:

In a carburetor system for an internal combustion engine mounted in a vehicle including a hand brake, and induction type carburetor having a throttle valve, and a manifold communicating with said carburetor, an auxiliary air supply system for supplying an increased amount of air to said carburetor during idling conditions of said engine, said auxiliary air supply system comprising a housing mounted exteriorly of said carburetor, a bore within said housing, a conduit connecting said housing bore with the interior of said carburetor downstream of said throttle valve, a piston slidably mounted within said housing bore, means coupling said housing bore to an air supply source rearwardly of the leading end of said piston, means urging said piston to a normal position in which it at least partially interrupts communication between said conduit and said air supply source, conduit means coupling said bore rearwardly of said piston with the interior of said engine manifold for movement of said piston to a position opening said conduit to said air supply source under the influence of high induction forces existing in said engine manifold when said engine is overrunning, and secondary means for placing said conduit into increased communication with said air supply source during the condition of stationary idling of said engine, said secondary means being independent of the induction forces in said manifold and comprising an alternate aperture establishing communication between said conduit and said air supply source, a sleeve, means biasing said sleeve to overlie said alternate aperture, and coupling means connecting said sleeve to said vehicle hand brake for operation of said sleeve to uncover said alternate aperture upon manual actuation of said hand brake.

References Cited by the Examiner

UNITED STATES PATENTS

| 1,710,488 | 4/29 | Oliphant. |
| 1,882,725 | 10/32 | Asire. |
| 1,986,461 | 1/35 | Bellis _____ 192—3 X |
| 2,094,555 | 9/35 | Von Hilbety |
| 2,386,340 | 10/45 | Olson. |
| 2,724,375 | 11/55 | Schaffer. |
| 2,763,285 | 9/56 | Reeves. |
| 2,868,521 | 1/59 | Dietrich _____ 261—41 |
| 2,916,116 | 12/59 | Eddy et al. _____ 192—3 |

FOREIGN PATENTS

| 405,346 | 2/34 | Great Britain. |

NORMAN YUDKOFF, *Primary Examiner.*

HARRY B. THORNTON, BROUGHTON DURHAM, *Examiners.*